Dec. 28, 1926.
E. N. LIGHTFOOT
TEMPERATURE CONTROLLED SWITCH
Filed Sept. 25, 1920  3 Sheets-Sheet 1
1,611,924
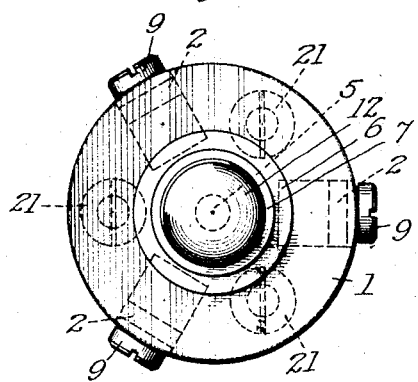
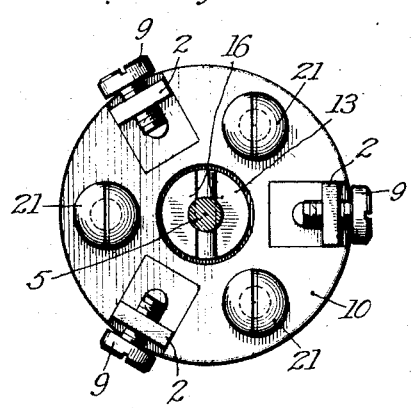
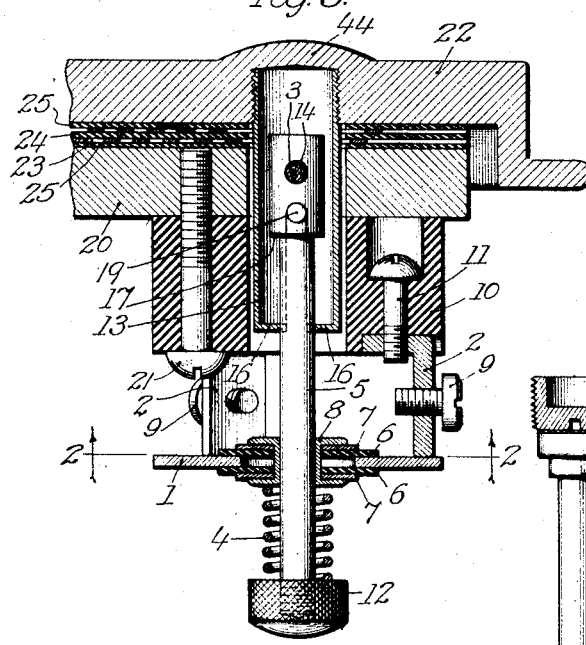
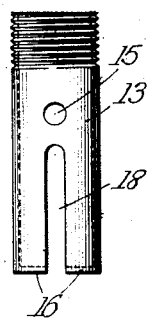
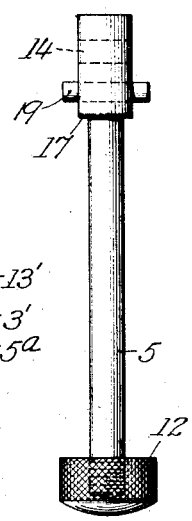
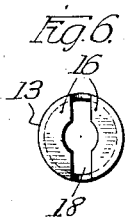
Inventor
Edwin N. Lightfoot
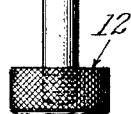

Dec. 28, 1926.

E. N. LIGHTFOOT

TEMPERATURE CONTROLLED SWITCH

Filed Sept. 25, 1920

Inventor:
Edwin N. Lightfoot

Dec. 28, 1926.
E. N. LIGHTFOOT
TEMPERATURE CONTROLLED SWITCH
Filed Sept. 25, 1920
1,611,924
3 Sheets-Sheet 3
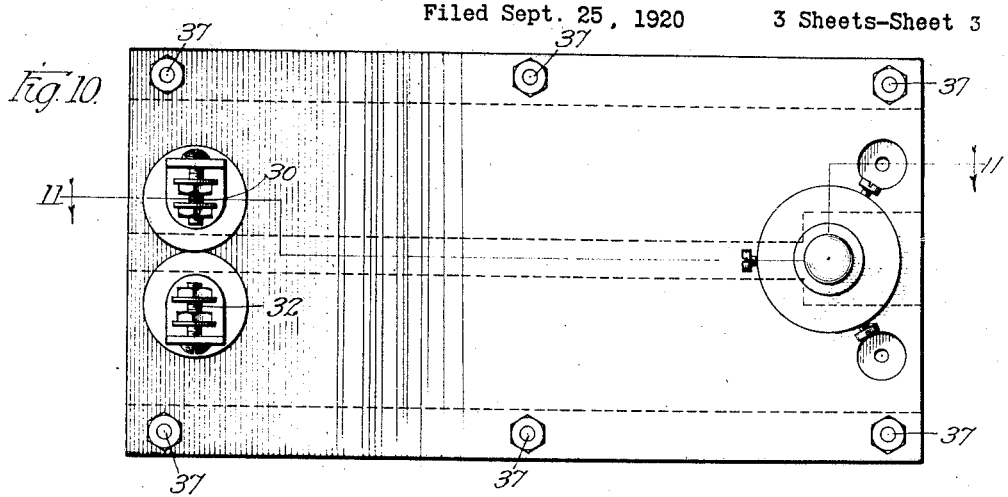
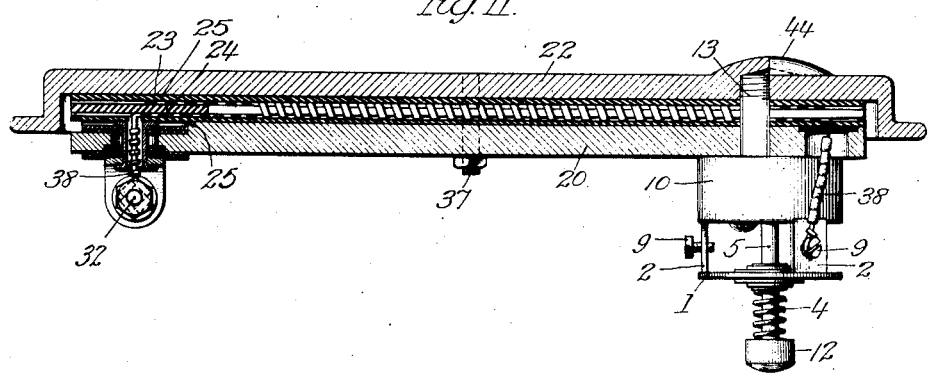
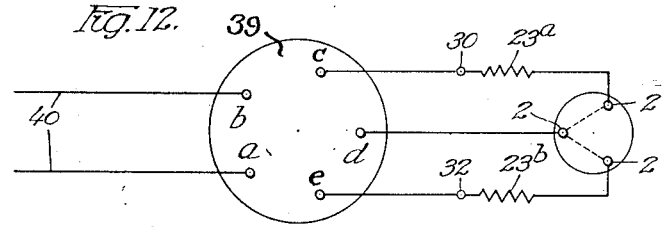
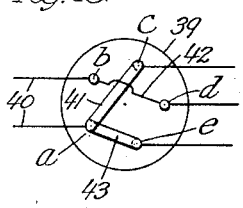 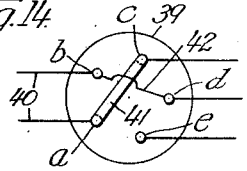 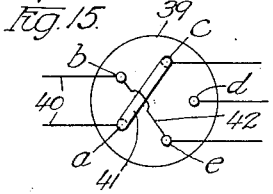
Inventor:
Edwin N. Lightfoot Patented Dec. 28, 1926.

1,611,924

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

TEMPERATURE-CONTROLLED SWITCH.

Application filed September 25, 1920. Serial No. 412,861.

This invention relates to a temperature controlled switch.

Such switches are particularly applicable for protecting electric heaters arranged to develop several degrees of heat, although not limited to such use.

Electric heaters for heating water are frequently maintained against or in contact with the bottom of the vessel containing the water. Such heaters operate satisfactorily as long as there is water in the vessel. When the water has evaporated leaving the vessel dry, however, the temperature of the heater increases very rapidly and to such an extent that there is danger of damaging or destroying either the heater or the vessel, or both.

To guard against damaging or destroying the heater or the vessel, fuses have been employed which operate when attaining a predetermined temperature and open the current supply circuit.

According to present practices where it is desired to protect heaters developing more than one heat, it is usual to employ a single circuit fuse. This necessitates the use of more than one fuse for each such heater, and complicates the arrangement of the connections between the current supply circuit, the heater, the fuse and the usual control switches.

An object of this invention is to provide an improved temperature controlled switch.

Another object is to provide a temperature controlled switch which when employed with heaters developing a plurality of degrees of heat overcomes the objections heretofore experienced.

Another object is to provide a temperature controlled switch in which the heat developed by the associated heater must pass through the heat responsive member thereof.

Another object is to provide a temperature controlled switch having a fusible element in series with the flow of heat developed by the apparatus to be protected.

Another object of the invention is to provide a simple, durable and efficient temperature controlled switch of few parts, which may be easily and quickly assembled, and associated with the apparatus to be protected.

Other objects and advantages will hereinafter appear.

According to the invention, the temperature controlled switch comprises a contactor normally held in engagement with a plurality of contacts, one for each of several heater circuits, by the fusible element in cooperation with resilient means. When the fusible element attains a predetermined temperature, the resilient means overcomes the fusible element and causes the disengagement of the contactor and the contacts, thereby opening the several heater circuits.

The temperature controlled switch may be mounted directly upon the heater to be protected thereby.

An embodiment of the invention is illustrated in the accompanying drawings, wherein:

Figure 1 is a bottom plan of the temperature controlled switch;

Fig. 2 is a transverse section on the line 2—2 of Fig. 3;

Fig. 3 is a vertical section through the temperature controlled switch;

Fig. 4 is a view of the plunger of the temperature controlled switch;

Fig. 5 is a side elevation of the sleeve with which the plunger is held in cooperative relation by the fusible element;

Fig. 6 is a bottom plan of the sleeve;

Fig. 7 shows a plunger connected to a plug by a film of fusible material;

Fig. 10 is a plan of an electric heater with the temperature controlled switch mounted near one end thereof;

Fig. 11 is a vertical section through the bottom plate of a sterilizer to which is fastened the heater of Fig. 9;

Fig. 12 shows diagrammatically the connections between the temperature controlled switch and the heater and a control switch therefor; and Figs. 13, 14 and 15 show the different connections at the control switch whereby the heater is controlled to develop different degrees of heat.

Figs. 1 to 6 show the construction of the temperature controlled switch.

Figure 8:
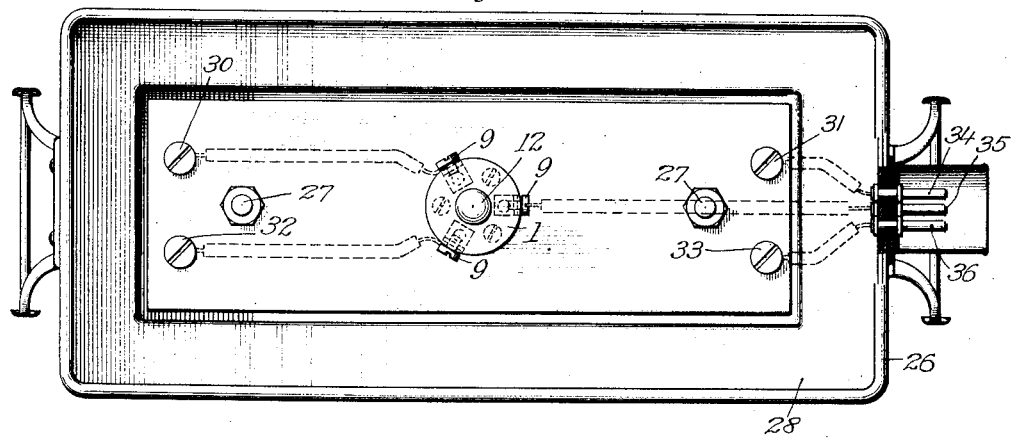
Fig. 8 is a bottom plan of a sterilizer equipped with an electric heater provided with the protective temperature controlled switch.

The temperature controlled switch comprises a contactor 1 normally held in engagement with three contact fingers 2 by a fuse pin or link 3 against the action of a coiled spring 4.

The contactor 1 is in the form of an annular disk carried by the plunger 5 and is free to slide thereon. This disk contactor 1 is insulated from the plunger 5 by means of insulating washers 6. The insulating washers 6 are held in position on the contactor 1 by means of metal washers 7 and an eyelet 8.

The contact fingers 2, each provided with a screw 9 for connecting a conductor thereto, are mounted on an insulating base 10 and fastened thereto by screws 11.

The coiled spring 4 is interposed between the lower end of the eyelet 8 fastened to the contactor 1 and the knurled head 12 of the plunger 5.

The fuse link may be of any suitable fusible material or alloy.

The fuse link 3 extends through aligned openings 14 and 15 in the plunger 5 and sleeve 13 and is held thereby. The plunger 5 and the sleeve 13 are thus locked together by the fuse link 3. The sleeve is made of brass or any other suitable material.

The lower end of the sleeve 13 is provided with inwardly extending flanges 16 against which the shoulder 17 on the plunger strikes when the fuse blows. The flanges thus prevent the plunger 5 from falling away from the sleeve 13.

The sleeve 13 is provided with diametrically opposed slots 18 for the reception of the ends of the pin 19 carried by the plunger 5. These slots thus guide the plunger within the sleeve and prevent the same from turning so that the fuse openings 14 and 15 may be the more easily and quickly aligned.

The fuse switch may be mounted directly on the apparatus to be protected.

For example, the insulating base 10 which carries the contact fingers 2 may be fastened to the plate 20 by screws 21. The sleeve 13 extends through an opening in the insulating base 10 and may be threaded into the plate 22 which may form the bottom of a sterilizer as will more fully hereinafter appear.

The resistor 23 of the heater wound on an insulating core 24 may be interposed between the plates 20 and 22 and insulated therefrom by insulating strips 25. The plates 20 and 22 thus provide an armor for the resistor which is insulated therefrom.

When the temperature of the fuse link 3 attains a predetermined value, it then is not of sufficient strength to resist the action of the spring 4 which predominates and causes the fuse link 3 to either bend or break between the plunger and the sleeve. Thus the action of the spring forces the plunger downward until the fuse link is free of the openings 15 in the sleeve 13, when the weight of the plunger aided by the further action of the spring, causes the continued downward movement of the plunger until arrested by the engagement of its shoulder 17 against the flanges 16 of the sleeve. When the plunger is in such a position, the contactor is out of engagement with the contact fingers, thus opening the several heater circuits.

To reset the fuse switch, the plunger 5 and sleeve 13 are removed by unscrewing the sleeve from the plate 22. During this operation, the plunger serves as a wrench, the ends of the pin 19 carried thereby engaging the slots 18 in the sleeve 13.

The fragments of the old fuse link may then be removed from the plunger and the sleeve, after which the openings 14 and 15 therein may be brought into alignment and a new fuse link inserted.

The removable element comprising the plunger and sleeve is now reset, and may be replaced in the switch, thus bringing the contactor into engagement with the contact fingers and resetting the switch. As the sleeve 13 is screwed into the plate 22, the tension of the spring is increased, thus storing power for use in operating the switch upon an increase in temperature of the fuse link to a certain value.

The contactor or spring may be readily removed for replacement or repair by merely unscrewing the head 12 of the plunger. In the same way, the entire plunger 5 may be removed from the sleeve 13 after pin 19 has been withdrawn.

Figure 7 shows a plunger and associated plug which may be employed instead of the plunger and sleeve of Figs. 4 to 6.

The plunger 5 (of Fig. 7) carries a plate 5ᵃ which may be connected with the plug 13' by means of a film of fusible material 3'.

The face of the plug 13' is slotted for the reception of a screw driver for readily removing the plug from the base plate after the switch has operated to disengage the contactor and contacts.

Figure 9:
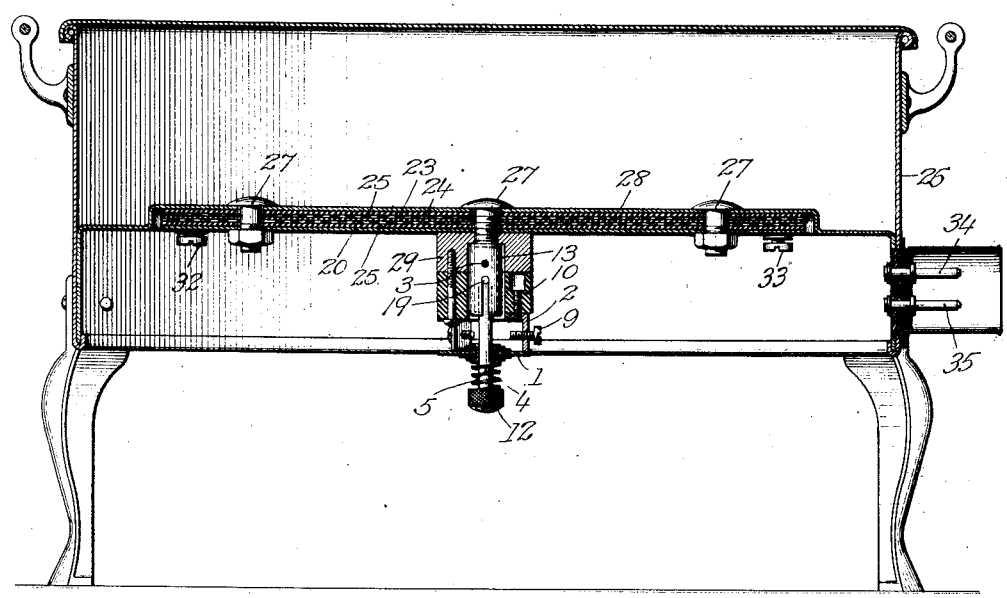
Fig. 9 is a vertical section through the temperature controlled switch, heater and sterilizer of Fig. 8.

Figures 8 and 9 show a sterilizer heated by an electric heater fastened thereto by bolts 27 and having the temperature controlled switch secured to the heater by one of the bolts 27. The heads of the bolts may be soldered to the bottom plate 28 of the sterilizer thereby preventing water from leaking through the bottom.

The insulating base 10 of the temperature controlled switch is fastened to a block 29 which is held in position against the plate 20 by the bolt 27.

The sleeve 13 is internally threaded for engagement with the threaded end of the bolt 27.

The resistor of the heater is divided into two sections, the ends of one section being connected to terminals 30 and 31 and those of the other to terminals 32 and 33. Terminals 30 and 32 may be connected by conductors (indicated in dotted line) to two of the contact fingers of the switch, while the terminals 31 and 33 may be similarly connected to two of three plug terminals 34, 35 and 36 mounted on the side of the sterilizer. The third plug terminal 35 is connected by a conductor (indicated in dotted line) to the third contact finger of the switch.

Figures 10 and 11 show the bottom plate for a sterilizer having the electric heater and temperature controlled switch fastened thereto thus forming a unit.

The bottom 22 for the sterilizer forms one armor plate for the heater, the insulated resistor of which is interposed between the bottom 22 and the armor plate 20 and clamped therebetween by the bolts 37.

The resistor is in two sections, the left hand ends being connected to terminals 30 and 32, and the right hand ends being connected directly to two of the contact fingers 2 of the switch mounted contiguous thereto. The exposed resistor ends are protected by insulating beads 38.

Figure 12 shows how the temperature controlled switch, and the electric heater and a multiheat control switch 39 therefor may be connected in circuit with a source of current supply 40.

The line wires 40 are connected to the terminals $a$ and $b$ of the control switch 39. Terminals $c$ and $e$ of the control switch are connected with terminals 30 and 32 respectively of the heater sections $23^a$ and $23^b$. Terminal $d$ of the control switch 39 is connected with one of the contact fingers 2 of the temperature controlled switch, the other two contact fingers of which are connected to the free ends of the heater sections $23^a$ and $23^b$.

Figure 13 shows the control switch contact straps or levers 41, 42 and 43 adjusted to connect the two heater sections $23^a$ and $23^b$ in circuit in parallel, thus causing the heater to develop one degree of heat.

Figure 14 shows the contact straps 41 and 42 adjusted to connect only the heater section $23^a$ in circuit, thus causing the heater to develop a higher degree of heat.

Figure 15 shows the contact straps 41 and 42 adjusted to connect the heater sections $23^a$ and $23^b$ in circuit in series, thus allowing the heater to develop a still higher degree of heat.

The composition and size of the fuse link is so chosen that so long as the head of the middle bolt 27 (Fig. 9) or the bead 44 on the plate 22 (Figs. 3 and 10) is covered with water, the heater and sterilizer are being operated at a safe temperature and the plunger 5 is held in locked position thus maintaining the switch closed.

When the level of the water in the sterilizer gets so low as to expose the head of the bolt 27 or the bead 44, the temperature of the heater and the bolt or bead increases rapidly due to the absence of the water which ordinarily prevents the increase in temperature. The heat thus developed is rapidly conducted through the sleeve 13 to the fuse link. When the temperature of the fuse link is increased to a certain value, the spring 4 overcomes the same causing the downward movement of the plunger 5 and the disengagement of the contactor or bridging contact 1 and the contact fingers 2. The circuit through the heater is thus opened, and the heater and the sterilizer are protected against such high temperatures as might prove destructive to either or both.

The described embodiments have been chosen for purposes of illustration only, and the drawings and description thereof are therefore to be considered in an illustrative and not in a limiting sense, for it is obvious that many changes and adaptations may be made by and will readily occur to those skilled in the art.

The invention claimed is:

1. A temperature controlled switch for controlling the continuity of several circuits, comprising a plurality of contacts adapted to be connected in the several circuits, a support having an opening therein with the contacts arranged around the opening and carried by the support, a disk contactor, a member slidable through the disk contactor and into the opening of the support, a spring holding the contactor in engagement with the contacts and normally tending to move the member, and temperature controlled means within the opening normally holding the member stationary against the action of the spring.

2. A temperature controlled switch comprising cooperating contacts tending to disengage under the force of gravity and means for retaining said contacts in an engaged relation including a fusible element, a member retained thereby in fixed position and a resilient connection between said member and certain of said contacts to act on the latter in opposition to the force of gravity and on the former to free the same from restraint by said fusible element under given temperature conditions.

3. A temperature controlled switch comprising co-operating contacts tending to disengage under the force of gravity, means to cause engagement of said contacts including a reciprocable member and a resilient connection between the same and certain of said contacts, a device operable by rotation of said member to connect the same to a fixed part, said device including a fusible element to permit actuation of said member by said spring for release of said contacts under abnormal temperature conditions.

4. A temperature controlled switch having in combination a support, a plurality of contacts and a cylinder carried thereby, a temperature controlled member, a plunger adapted for movement within the cylinder and normally held in fixed relation thereto by the temperature controlled member, and a contactor whose engagement with the contacts is controlled by the plunger, the plunger and cylinder being interlocked to permit removal thereof as a unit from the support after the switch is opened.

5. A temperature controlled switch comprising a support, a plurality of contacts and a cylinder carried thereby, a temperature controlled member, a plunger adapted to move within the cylinder and normally held in fixed relation thereto by the temperature controlled member, a contactor carried by the plunger, and a spring cooperating with the plunger and holding the contactor in engagement with the contacts, the contactor, plunger and cylinder being removable as a unit from the support after the switch is opened.

6. In a temperature controlled switch having in combination a support, a contact carried thereby, a plunger, a temperature controlled member normally holding the plunger in fixed relation to the support, a contact slidable on the plunger, and a spring cooperating with the plunger to hold the contacts in engagement at temperatures of said member below a certain value, and causing movement of the plunger to disengage the contacts at a certain temperature of said member.

7. In a temperature controlled switch having in combination a support, a contact carried thereby, a plunger, a temperature controlled member normally holding the plunger in fixed relation to the support, a contact carried by the plunger, and a spring cooperating with the plunger to hold the contacts in engagement at temperatures of said member below a certain value, and causing movement of the plunger to disengage the contacts when said member attains a certain temperature, the plunger and the contact carried thereby and the spring being removable as a unit from the support.

8. A temperature controlled switch comprising a support, a contact carried thereby, a temperature controlled member, a plunger normally held thereby in fixed relation to the support, a contact carried by and slidable on the plunger to be engaged with the former contact but tending to disengage the same, and a spring normally holding the contacts in engagement for temperatures of the member below a certain value and causing the movement of the plunger at a certain temperature of the member, thereby to disengage the contacts.

9. A temperature controlled switch having in combination a support, a contact carried thereby, a spring, a temperature controlled member, a plunger normally held in fixed relation to the support by said member against the action of the spring and of gravity, and a contact carried by the plunger and held in engagement with the other contact by the spring, said contacts being arranged for separation thereof under the force of gravity when relieved of the force of said spring.

10. A temperature controlled switch having in combination a support, a contact carried thereby, a spring, a temperature controlled member, a plunger normally held in fixed relation to the support by the member against the action of the spring and of gravity, and a contact carried by the plunger and held in engagement with the other contact by the spring, the plunger and contact carried thereby and the spring being removable as a unit from the support.

11. An actuator for a temperature controlled switch having a plurality of contacts, comprising a support, a cylinder carried thereby, a plunger adapted to move within the cylinder, a temperature controlled member normally holding the plunger and cylinder in fixed relation, and a spring carried by the plunger and acting against the force of gravity to control the engagement of the contacts.

12. An actuator for a temperature controlled switch having a plurality of contacts, comprising a support, a cylinder, a temperature controlled member normally holding the plunger and cylinder in fixed relation against the action of gravity, and means carried by the plunger and adapted to control the engagement of the contacts, the plunger and cylinder and one of the contacts being removable as a unit from the support.

13. A temperature controlled switch having in combination a support, a contact and a guide carried thereby, a temperature controlled member, a plunger movable longitudinally with respect to the guide and normally held in fixed relation thereto by the member, a contact carried by and slidable on the plunger and normally in engagement with the other contact, means dependent upon the temperature of the member and controlling the movement of the plunger and the disengagement of the contacts, and means for limiting the movement of the plunger.

In witness whereof, I have hereunto subscribed my name.

EDWIN N. LIGHTFOOT.